(12) United States Patent
Chan

(10) Patent No.: US 6,730,339 B2
(45) Date of Patent: May 4, 2004

(54) LOLLIPOP WITH FLUID RESERVOIR HANDLE

(75) Inventor: Pak Nin Chan, Kowloon (HK)

(73) Assignee: Candy Novelty Works Ltd., Kowloon (HK)

( * ) Notice: Subject to any disclaimer, the term of this patent is extended or adjusted under 35 U.S.C. 154(b) by 261 days.

(21) Appl. No.: 09/933,859

(22) Filed: Aug. 20, 2001

(65) Prior Publication Data

US 2003/0035865 A1 Feb. 20, 2003

(51) Int. Cl.[7] ................................................ A23G 3/00
(52) U.S. Cl. .................. 426/104; 426/115; 426/120; 426/134; 206/219; 222/153.05; 222/212; 222/525; 220/258.1; 220/258.3; 220/258.5
(58) Field of Search ................................ 426/104, 115, 426/120, 134; 222/153.05, 212, 522–525; 220/258.1, 258.3, 258.5, 714, 715; 206/219; 215/387, 388, 349, 232

(56) References Cited

U.S. PATENT DOCUMENTS

| | | | | |
|---|---|---|---|---|
| 1,340,043 A | * | 5/1920 | Grace ........................... 222/390 |
| 2,121,185 A | * | 6/1938 | Claff ............................ 426/104 |
| 2,252,119 A | * | 8/1941 | Edmonds ..................... 30/123.3 |
| 2,517,027 A | * | 8/1950 | Rado ............................. 222/94 |
| 2,766,123 A | * | 10/1956 | Moubayed .................... 426/132 |
| 2,771,219 A | * | 11/1956 | Dewey .......................... 222/93 |
| 3,105,612 A | * | 10/1963 | Krasnoff et al. ............... 222/78 |
| 3,146,904 A | * | 9/1964 | Hansen et al. ............... 215/11.1 |
| 3,178,060 A | * | 4/1965 | Bossack ........................ 222/78 |
| 3,545,980 A | * | 12/1970 | Stanger ......................... 426/85 |
| 3,684,455 A | * | 8/1972 | Vacirca et al. ................. 422/61 |
| 3,730,737 A | * | 5/1973 | Harvey et al. ................. 426/115 |
| 3,821,425 A | * | 6/1974 | Russell ........................ 426/110 |
| 3,833,154 A | * | 9/1974 | Markowitz ................... 222/212 |
| 4,229,482 A | * | 10/1980 | Kreske, Jr. .................... 426/134 |
| 4,630,756 A | * | 12/1986 | Amici et al. ................... 222/78 |
| 4,760,937 A | * | 8/1988 | Evezich ......................... 222/95 |
| 4,830,222 A | * | 5/1989 | Read ............................ 222/106 |
| 4,888,188 A | * | 12/1989 | Castner et al. ............... 426/109 |
| 5,137,183 A | * | 8/1992 | Mikulec et al. ............... 222/192 |
| 5,324,527 A | * | 6/1994 | Coleman ...................... 426/134 |
| 5,328,063 A | * | 7/1994 | Beck et al. .................... 222/524 |
| 5,433,328 A | * | 7/1995 | Baron et al. ................. 215/11.4 |
| RE35,577 E | * | 8/1997 | Coleman ...................... 426/134 |
| 6,368,646 B1 | * | 4/2002 | Monow et al. ............... 426/115 |
| 6,454,128 B1 | * | 9/2002 | Harris ........................... 222/78 |
| 6,527,109 B2 | * | 3/2003 | Schoo et al. ................. 206/219 |
| 6,565,899 B1 | * | 5/2003 | Cecere ........................... 426/85 |
| 6,568,566 B2 | * | 5/2003 | Smith ....................... 222/153.06 |

OTHER PUBLICATIONS

Wired, Jun. 1999, "Gross National Product", Frauenfelder.*
Product Alert, V. 26, N.17, Sep. 9, 1996, "Squirter Pop Liquid Lollipop Candy" (Dialog 1595553, Item 9, File 9).*

* cited by examiner

Primary Examiner—Steven L. Weinstein
(74) Attorney, Agent, or Firm—Delbert J. Barnard

(57) ABSTRACT

Liquid candy is molded into a body of hard candy HC with a tubular portion 24 of a holder 22, 24 anchored therein. The tubular portion 22 extends into close proximity to an outer surface of the hardened candy HC. A cup-shaped portion 22 of the holder is snapped onto a reservoir cap 70. The holder 22, 24 is snapped into a fully engaged position. When a consumer wishes to consume the candy product, the consumer pulls up on the holder 22, 24 to move it upwardly relative to the reservoir cap into a second engaged position. A break-away portion 74 of the cap 70 breaks away to open fluid communication between the reservoir 62 and a passageway 36 through the holder 22, 24.

11 Claims, 8 Drawing Sheets

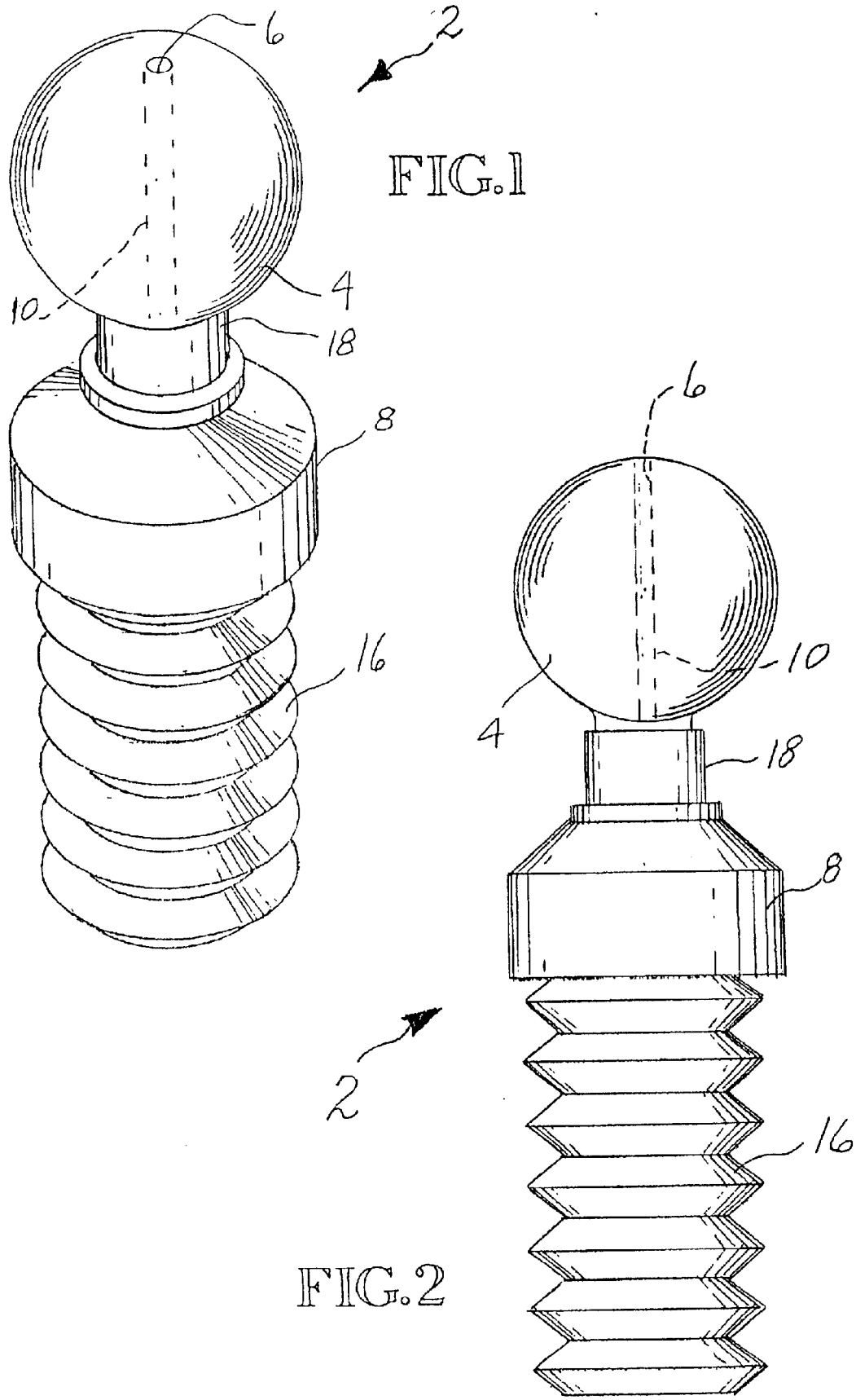

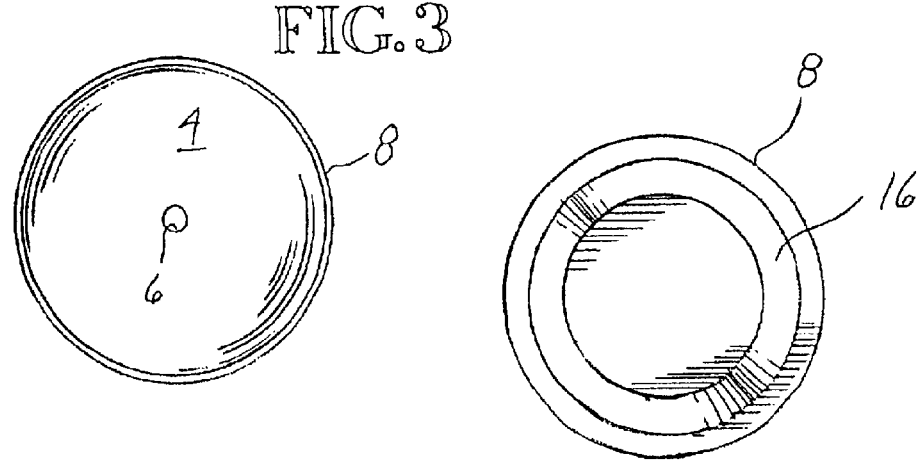
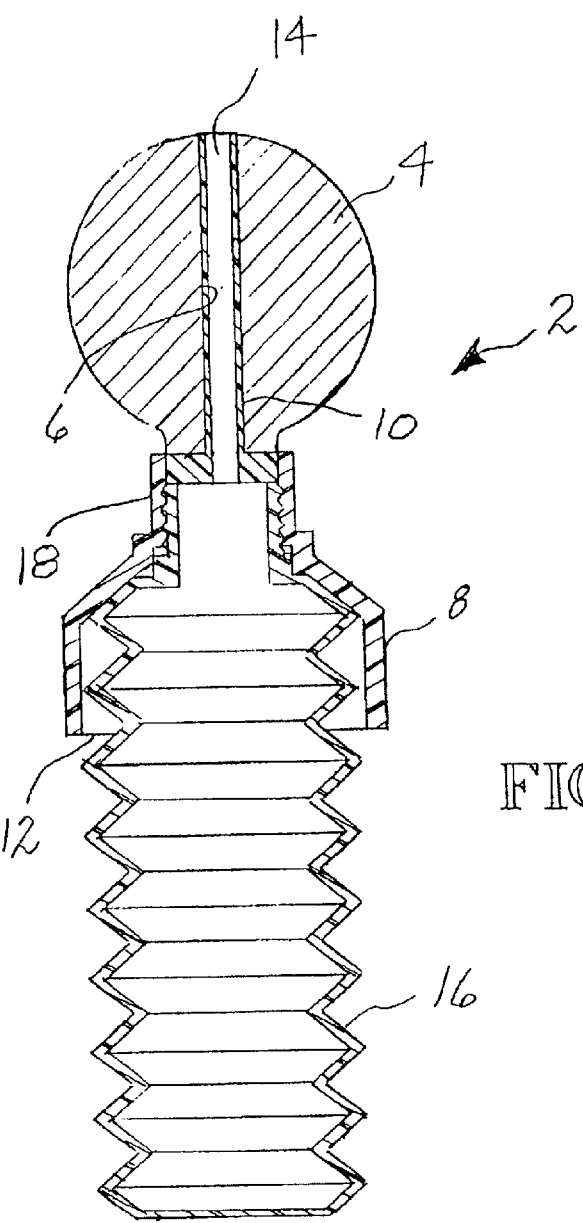

LOLLIPOP WITH FLUID RESERVOIR HANDLE

TECHNICAL FIELD

This invention relates to a candy product and a method of making the product and, more particularly, to a product and method in which a holder with hardened candy formed thereon is snap fit onto a reservoir cap and is slidable on the cap to permit a consumer to pull up on the holder without removing the holder from the cap to detach a breakaway portion of the cap and open fluid communication between the reservoir and a passageway in the hardened candy.

BACKGROUND INFORMATION

In recent years, there has been a substantial increase in novelty candy products that are designed, at least primarily, to appeal to children. A number of these products are variations on the traditional concept of a lollipop. Lollipops that are provided with an edible liquid in addition to the conventional hard candy body have been proposed. Two such lollipops are disclosed in U.S. Pat. No. 4,229,482, granted Oct. 21, 1980 to A. Kreske, Jr.; and U.S. Patent No. Re. 35,577, reissued Aug. 5, 1997 to T. J. Coleman.

BRIEF SUMMARY OF THE INVENTION

The invention provides a method of manufacturing a candy product. According to an aspect of the invention, the method comprises providing a holder having a cup-shaped portion and a tubular portion projecting from the cup-shaped portion. A pin is inserted into the holder through the cup-shaped portion and the tubular portion to an outer end of the tubular portion opposite the cup-shaped portion. Liquid candy is dispensed into a cavity in a mold. The tubular portion of the holder with the pin inserted therein is inserted into the liquid candy in the cavity. The candy is allowed to harden to anchor the tubular portion in the candy. The hardened candy is removed from the mold, and the pin is removed from the holder to leave a passageway extending through the holder. A reservoir is sized and shaped to be gripped by a consumer's hand. A reservoir cap is configured to close an open end of the reservoir and has a break-away portion. The reservoir is filled with an edible fluid and closed by securing the cap over the open end. The cup-shaped portion of the holder is snapped onto the cap. The cup-shaped portion engages the cap in a manner that permits a subsequent consumer to pull up on the holder without removing the holder from the cap, to detach the break-away portion and open fluid communication between the reservoir and the passageway through the holder.

The term "fluid" is used herein in a broad sense to include liquid, particulate, and powdered materials. "Particulate" materials include what is commonly known as "popping candy", which consists of small hollow particles of candy that are filled with carbon dioxide to create a bursting sensation on the tongue. The term "detach", in relation to the break-away portion of the cap, includes both full and partial separation from the main body of the cap. The terms "up", "below", and "top", and the like refer to the expected use orientation illustrated in FIGS. 1, 2, 6, 19, and 20.

A preferred feature of the method is, when inserting the pin into the holder, snapping an enlarged width portion of the pin into releasable engagement with an inner surface of the cup-shaped portion of the holder and maintaining an outer portion of the pin projecting outwardly from the holder opposite the tubular portion. This feature has the advantage of facilitating handling of the holder and the body of hardened candy. For example, removing the pin from the holder preferably includes engaging the projecting outer portion of the pin.

The extent to which the tubular portion is inserted into the liquid candy may vary. Preferably, the tubular portion is moved into a position in which the outer end of the tubular portion is in close proximity to, but spaced from, an inner wall of the mold defining the cavity. This procedure has the advantage of protecting the end of the tubular portion from damage that might be caused by contact with the walls of the mold. In addition, the close proximity to the mold wall leaves only a thin layer of hardened candy blocking the passageway so that a consumer can dissolve the thin layer by a few quick licks when the consumer begins to eat the hardened candy. This enables the consumer to also begin consumption of the edible fluid whenever the consumer desires following the first few licks.

The invention also provides a candy product. According to an aspect of the invention, the product includes a solid body of candy having a passage extending at least substantially therethrough. A holder includes a cup-shaped portion having an open end, and a tubular portion projecting from the cup-shaped portion opposite the open end. The tubular portion extends from the cup-shaped portion into the passage and is anchored in the passage. The holder has a passageway extending through the cup-shaped portion and the tubular portion. A reservoir is sized and shaped to be gripped by a consumer's hand and has an open end. An edible fluid at least substantially fills the reservoir. A reservoir cap is secured to the reservoir and closes the open end. The cup-shaped portion of the holder is snap fit onto the cap. The cup-shaped portion and the cap have interengaging portions that allow a consumer to exert a pulling force on the holder to move the holder upwardly relative to the cap without removing the holder from the cap. The cap has a break-away portion that is sufficiently frangible to break away when the holder is moved upwardly relative to the cap, to open fluid communication between the reservoir and the passageway.

The structure of the reservoir may be varied. Preferably, the reservoir is elongated and generally cylindrical. The reservoir may have a configuration, such as the body of a skeleton, to increase its appeal to children. The reservoir is preferably structured so that a consumer can squeeze edible fluid from the reservoir into the passageway in the holder. One way of accomplishing this is to make the reservoir compressible to allow squeezing by a consumer. In addition or in the alternative, the reservoir may be made at least partially from a flexible material to allow a consumer to squeeze the reservoir.

Other details in the structure of the elements of the candy product may also be varied. The holder may include two or more parts that are secured together. However, the holder is preferably integrally formed. An end of the passage in the body of candy is preferably closely proximate to, but spaced from, an outer surface of the body of candy. This leaves a thin layer of candy blocking an end of the passageway in the holder adjacent to the end of the passage. Also preferably, the tubular portion of the holder extends into the passage to an end of the passage.

The details of the structure of the interengaging portions of the cup-shaped portion of the holder and the cap may also be varied. Preferably, the interengaging portions include a ridge on a side inner surface of the cup-shaped portion spaced longitudinally below an upper inner surface of the cup-shaped portion. A projection on a top portion of the cap is positioned to engage the ridge when the holder is moved upwardly relative to the cap.

The method of the invention has the advantages of being relatively inexpensive to carry out and of reliably producing a desired product that has a high degree of appeal to consumers. The product of the invention provides a combination of edible elements and has a maximized ease of use. In addition, it has a high degree of flexibility to allow for variations to enhance its taste and/or aesthetic appeal to different types of consumers.

These and other advantages and features of the invention will become apparent from the detailed description of the invention that follows.

BRIEF DESCRIPTION OF THE DRAWINGS

In the drawings, like element designations refer to like parts throughout, and:

FIG. 1 is a pictorial view of a lollipop having a handle reservoir with an accordion configuration.

FIG. 2 is an elevational view of the lollipop shown in FIG. 1.

FIG. 3 is a top plan view of the lollipop shown in FIGS. 1 and 2.

FIG. 4 is a bottom plan view of the lollipop shown in FIGS. 1–3.

FIG. 5 is a sectional view of the lollipop shown in FIGS. 1–4.

FIG. 7 is a sectional view illustrating a pin being inserted into a holder.

FIG. 8 is a sectional view showing the pin fully inserted into the holder.

FIG. 9 is a sectional view, with parts shown in elevation, of liquid candy being dispensed into a cavity in a mold.

FIG. 10 is a sectional view of the mold shown in FIG. 9 after the cavity has been filled with liquid candy and a tubular portion of the holder with the pin inserted therein has been inserted into the candy.

FIG. 11 is like FIG. 10 except that it shows the mold being opened and the hardened candy with the tubular portion anchored therein being removed from the mold.

FIG. 12 is a sectional view showing the pin being removed from the holder.

FIG. 13 is a sectional view of the hardened candy on the holder after the pin has been removed.

FIG. 14 is an elevational view of a reservoir being filled with an edible fluid.

FIG. 15 is an elevational view illustrating a reservoir cap being secured to the reservoir, with the cap shown in section.

FIG. 16 is an elevational view of the reservoir with the cap secured thereto.

FIG. 17 is a part elevational and part sectional view of the holder with the hardened candy thereon being moved into position to be snapped onto the reservoir cap.

FIG. 18 is like FIG. 17 except that it shows the components after the holder has been snapped onto the cap.

FIG. 19 is an elevational view of the candy product completed by the snapping of the holder onto the reservoir cap.

DETAILED DESCRIPTION OF THE INVENTION

Figure 6:
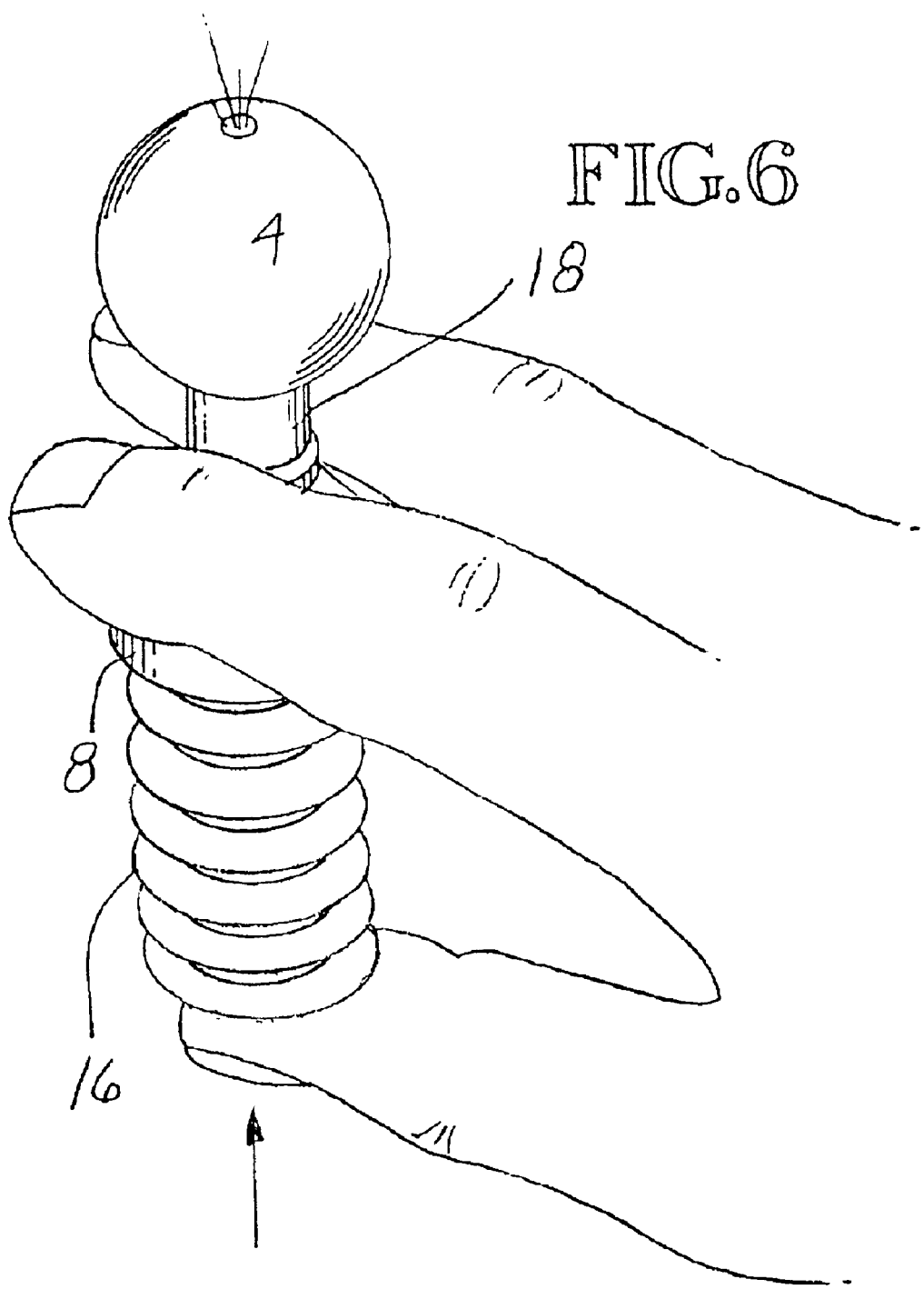
FIG. 6 is a pictorial view illustrating the manner in which an edible fluid may be dispensed from the reservoir shown in FIGS. 1, 2, 4, and 5.

FIGS. 7–20 illustrate a method of manufacturing a candy product that is currently the preferred embodiment of the method of the invention. FIGS. 7–23 also illustrate the currently preferred embodiments of the product of the invention. FIGS. 1–6 illustrate a candy product that has a reservoir with a structure that may be used as an alternative to the reservoir structures shown in FIGS. 14–20, and 22 and 23.

Referring to FIGS. 1–6, the candy product 2 shown therein may be viewed as a modification of a lollipop. The product 2 includes a spherical body of hard candy 4. A preferably straight and essentially cylindrical passage 6 extends through the body of candy 4. The body 4 is formed on a holder 8, 10 that includes a cup-shaped portion 8 and a tubular portion 10. The cup-shaped portion 8 has an open end 12. The tubular portion 10 projects from the cup-shaped portion 8 opposite the open end 12. The tubular portion 10 extends into the passage 6 in the candy body 4 and is anchored in the passage 6. A passageway 14 extends through the holder portions 8, 10.

The candy product 2 also includes a reservoir 16 for an edible fluid. A consumer of the product 2 can consume the candy body 4 by itself or in combination with the edible fluid from the reservoir 16. As shown in FIGS. 1, 2, 5, and 6, the reservoir has a generally cylindrical accordion configuration. The generally cylindrical nature of the reservoir 16 allows a consumer to grip the reservoir 16 to consume the candy 4 in the manner of a conventional lollipop. The reservoir 16 is made from a flexible material and can be compressed upwardly in the manner illustrated in FIG. 6 to force fluid from the reservoir 16 up through the passageway 14 and out onto the outer surface of the candy body 4 so that the consumer can consume a combination of the candy 4 and the fluid from the reservoir. Referring to FIG. 6, the holder 8, 10 has an upper neck portion 18 to provide space for the consumer's index and middle fingers on the top of the cup-shaped portion 8 of the holder without the fingers contacting the candy body 4. The consumer's thumb is placed on the bottom of the reservoir 16 and moved upwardly to force the fluid upwardly through the passageway 14 and out onto the outer surface of the candy 4.

Referring to FIGS. 7–20, a first preferred embodiment of the candy product of the invention includes a holder 22, 24, shown in the FIGS. 7, 8, 10–13, and 17–20. The holder includes a cup-shaped portion 22 having an open end 26 and a tubular portion 24 projecting from the cup-shaped portion 22 opposite the open end 26. A passageway 36 extends through the cup-shaped portion 22 and the tubular portion 24 of the holder. The passageway 36 extends from the open end 26 of the cup-shaped portion 22 to and through the outer end 34 of the tubular portion 24.

Referring particulary to FIGS. 7, 12, 13, 17, and 20, the cup-shaped portion 22 of the holder has a side inner surface with a substantially cylindrical configuration. An annular ridge 28 is formed on the surface. The ridge 28 is parallel to and spaced a short distance inwardly of the open end 26. The cup-shaped portion 22 also has an upper inner surface 30 that is perpendicular to the side inner surface and faces the open end 26. A second ridge 32 parallel to the first ridge 28 is formed on the side inner surface proximate to but spaced downwardly from the upper inner surface 30. The vertical separation between the two ridges 28, 30 functions as described below. The cup-shaped portion 22 also has a substantially cylindrical upper recess 37 that has a radius smaller than, preferably somewhat less than half of, the radius of the ridges 28, 30. This recess 37 communicates with the portion of the passageway 36 that extends through the tubular portion 24. The holder 22, 24 is preferably integrally molded from a plastic material.

Referring to FIGS. 7, 8, and 10–12, a pin 38 is used in the manufacture of the preferred embodiment of the candy product in accordance with the preferred embodiment of the method of manufacture. The pin 38 has a shaft 40 in the form of a cylindrical rod. The pin 38 has an enlarged width portion 42 that extends from an end of the shaft 40 to an annular projection 44 on the outer surface of the pin 38. The projection 44 projects radially from the outer pin surface and also defines a step in the diameter of the pin 38. In other words, the enlarged portion 42 has a first diameter between the shaft 40 and the projection 44 and a second somewhat larger diameter between the projection 44 and the outer end of the pin 38. The part of the pin 38 extending outwardly from the projection 44 to the outer end may be regarded as an outer portion 46 of the pin 38. At the outer end, a flange 48 extends radially from the outer portion 46. The enlarged width portion 42, including the outer portion 46, defines a cavity 50 that opens onto the outer end facing away from the shaft 40. Both the flange 48 and the cavity 50 contribute to the easy handling of the pin 38. The cavity 50 gives the outer portion 46 of the pin 38 flexibility. It also reduces the weight of the pin 38 and helps reduce cost by decreasing the amount of material in the pin 38. The pin 38 is preferably integrally molded from a plastic material.

Figure 7:
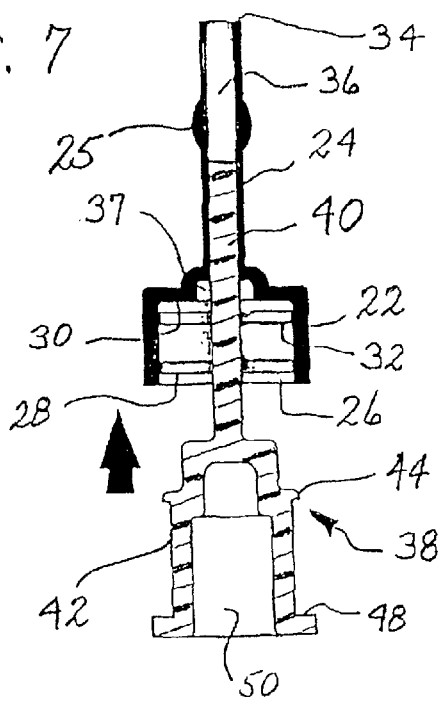
FIGS. 7–19 illustrate the preferred method of manufacture of the candy product.
Figure 8:
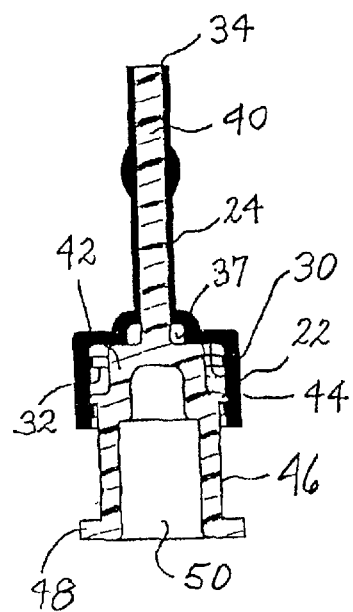

Referring to FIGS. 7 and 8, the method of manufacturing the candy product comprises inserting the pin 38 into the holder 22, 24 through the cup-shaped portion 22 and the tubular portion 24 to the outer end 34 of the tubular portion 24 opposite the cup-shaped portion 22. FIG. 7 shows the shaft 40 of the pin 38 being inserted into the holder. The arrow in FIG. 7 indicates the direction of movement of the pin 38 relative to the holder 22, 24. The shaft 40 of the pin 38 extends through the cup-shaped portion 22 and up into the passageway 36 in the tubular portion 24. The shaft 40 has an outer diameter that is substantially equal to the inner diameter of the tubular portion 24.

Figure 10:
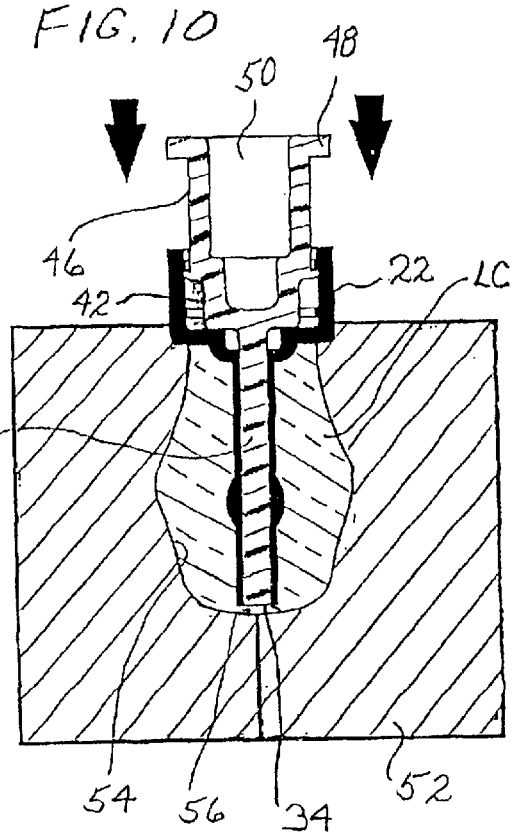
Figure 11:
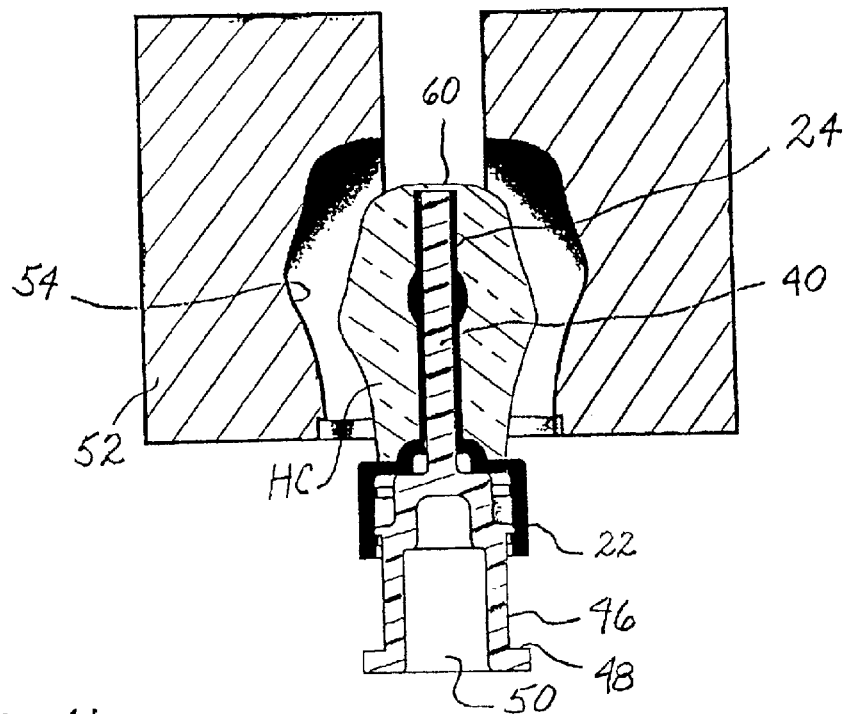

FIG. 8 shows the pin 38 inserted all the way into the holder 22, 24. The shaft 40 extends into the tubular portion 24 to the outer end 34 of the tubular portion 24 to completely fill the tubular portion 24. A radial surface of the enlarged width portion 42 of the pin 38 abuts the upper inner surface 30 of the cup-shaped portion 22 of the holder. This abutment defines the maximum extent to which the pin 38 can be inserted into the holder 22, 24. The projection 44 on the pin 38 has snapped past the ridge 28 on the cup-shaped portion 22 so that the pin 38 will remain inserted into the holder 22, 24 unless a positive force is exerted on the pin 38 and/or the holder 22, 24 sufficient to flex one or both of these plastic elements so that the projection 44 may be moved outwardly past the ridge 28. As can be seen in FIGS. 8, 10, and 11, in the fully inserted position of the pin 38, the outer portion 46 of the pin 38 projects outwardly from the cup-shaped portion 22 of the holder.

Figure 9:
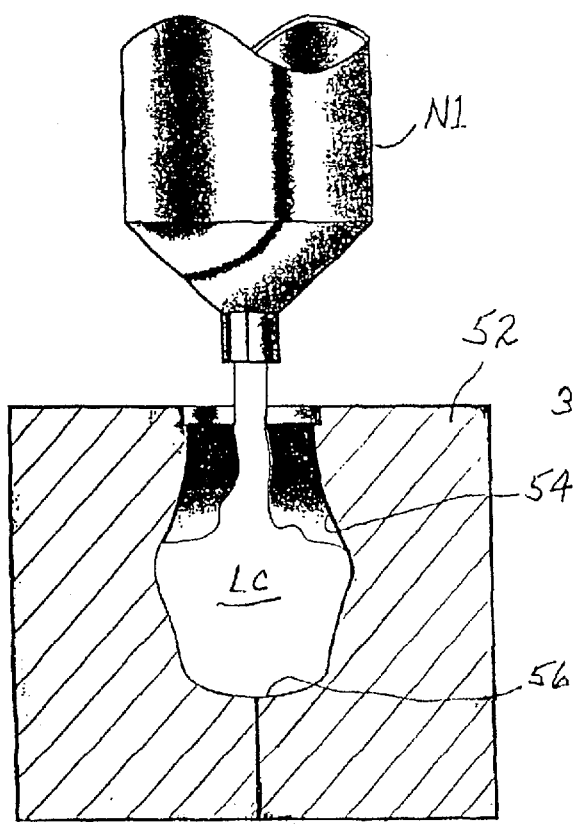

Referring to FIG. 9, the method includes dispensing liquid candy LC into a cavity 54 in a mold 52. The candy LC is dispensed through a nozzle N1 in a known manner. When the cavity 54 has been filled with a desired amount of candy LC, the tubular portion 24 of the holder, with the pin 38 inserted therein, is inserted into the candy LC in the cavity 54. FIG. 10 illustrates the pin 38 fully inserted into the candy LC. The arrows in FIG. 10 illustrate the direction of movement of the holder 22, 24 and pin 38 relative to the mold 52 as the holder/pin is inserted into the candy LC. In the fully inserted position, the outer end 34 of the tubular portion 24 is in a position in which the outer end 34 is in close proximity to, but spaced from, an inner wall 56 defining the cavity 54. After the holder/pin has been inserted, the liquid candy LC is allowed to harden to anchor the tubular portion 24 in the candy. Since the outer end 34 of the tubular portion 24 is spaced from the mold wall 56, the hardened candy HC has a thin layer 60 of candy blocking the outer end of the passageway 36 at the outer end 34 of the tubular portion 24. The tubular portion 24 forms a passage 58 extending substantially through the body of hardened candy HC.

Figure 12:
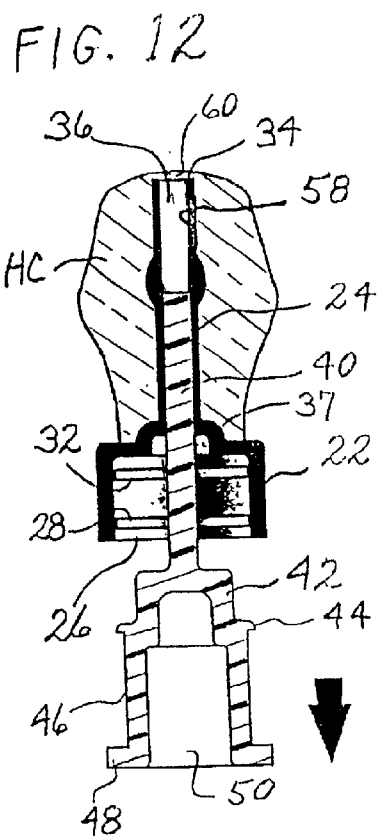
Figure 13:
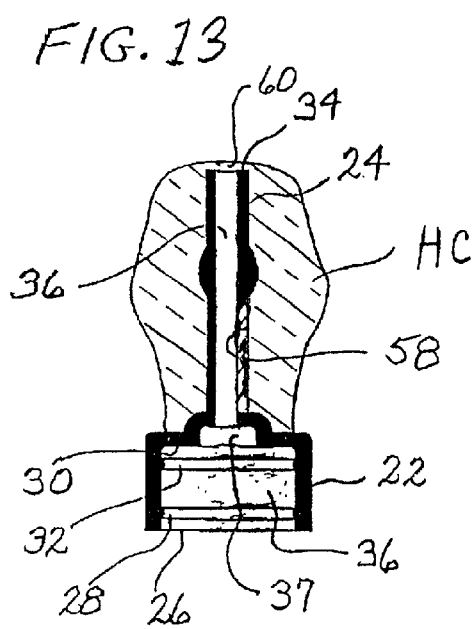

When the candy has hardened, the hardened candy HC is removed from the mold 52, as illustrated in FIG. 11. The mold 52 has a conventional structure in which it is made up of two halves that are moved apart to open the mold and release the molded and hardened candy HC. After the candy HC has been removed from the mold 52, the pin 38 is removed from the holder 22, 24 to leave the unobstructed passageway 36 extending through the holder 22, 24 from the open end 26 of the cup-shaped portion to the outer end 34 of the tubular portion 24. FIG. 12 illustrates the removal of the pin 38. Preferably, the removal is accomplished by moving the pin 38 in the direction indicated by the arrow in FIG. 12. As the pin 38 is being removed, it flexes an amount sufficient to allow the projection 44 to slide past the ridge 28. Preferably, the holder is held against movement by engaging the outer radial surface of the cup-shaped portion 22. A pulling force is exerted on the flange 48 of the pin 38 to move the pin 38 outwardly. FIG. 13 shows the holder 22, 24, with the hardened candy HC formed thereon following the removal of the pin 38.

Figure 14:
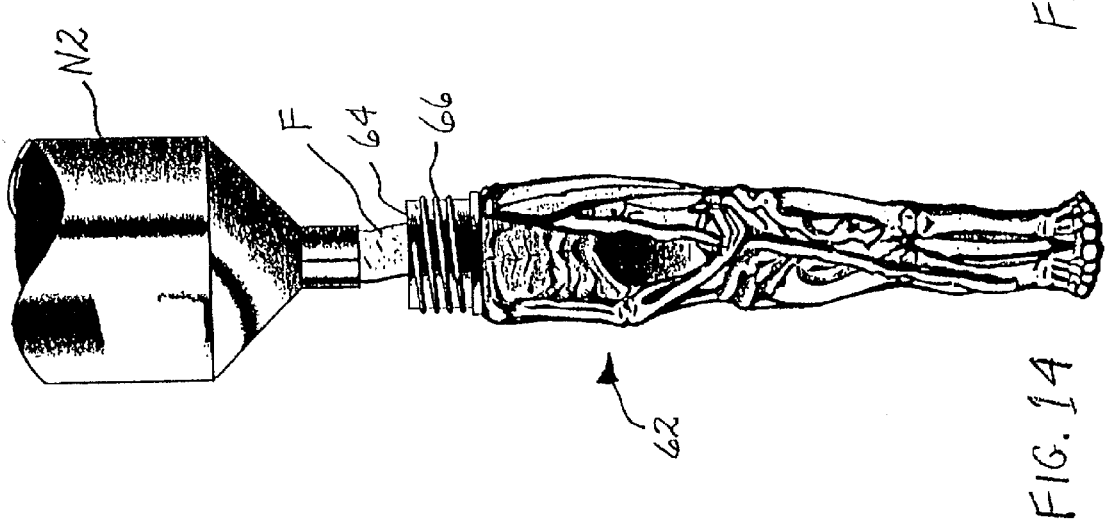
Figure 23:
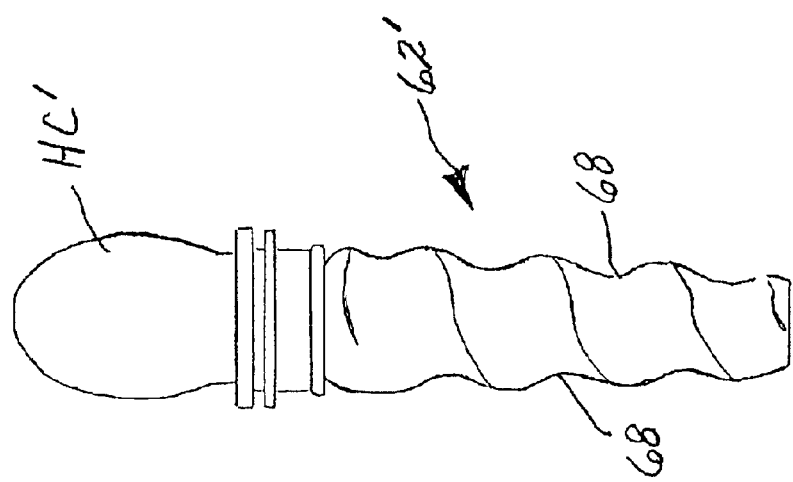
FIG. 23 is like FIG. 22 except that it shows all the parts in elevation.
Figure 22:
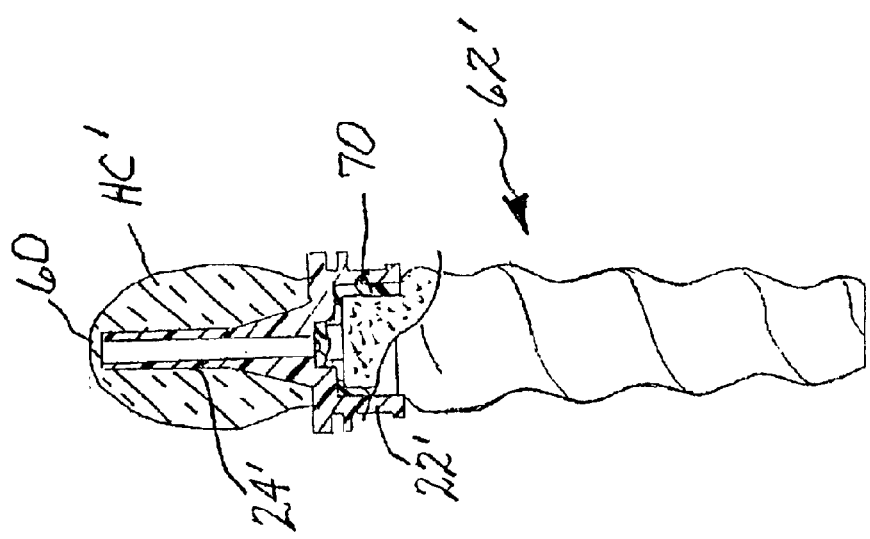
FIG. 22 is like FIG. 18 except that it shows the holder shown in FIG. 21 and a modified form of the reservoir, which is currently the most preferred embodiment of the reservoir.

As described above, the candy product has two edible components, the hardened candy HC and an edible fluid. Preferably, the two components have complementary flavors. Referring to FIG. 14, a reservoir 62 for the edible fluid is sized and shaped to be gripped by a consumer's hand. The reservoir 62 shown in FIGS. 14–20 is generally cylindrical and has design elements that make it resemble a human skeleton. This particular design is chosen to appeal to children. A wide variety of other design configurations could be chosen. The reservoir could also have a simple geometrical shape, such as a simple cylinder, or the accordion configuration shown in FIGS. 1, 2, 5, and 6. Currently, the configuration shown in FIGS. 22 and 23 is most preferred. The reservoir 62 has an open end 64. Adjacent to the open end 64, the reservoir has a cylindrical neck portion with threads 66 formed thereon. The reservoir 62 is made from a flexible plastic material and is compressible to allow a consumer to squeeze the edible fluid from the reservoir 62 into the passageway 36 in the holder 22, 24. FIG. 14 illustrates the reservoir 62 being filled through a nozzle N2 with an edible fluid F. The fluid F is illustrated as a gelatinous liquid but may also be a less viscous liquid or even a powder or particulate material.

Figure 16:
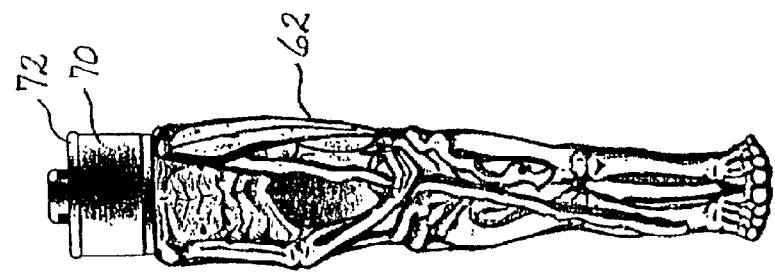
Figure 15:
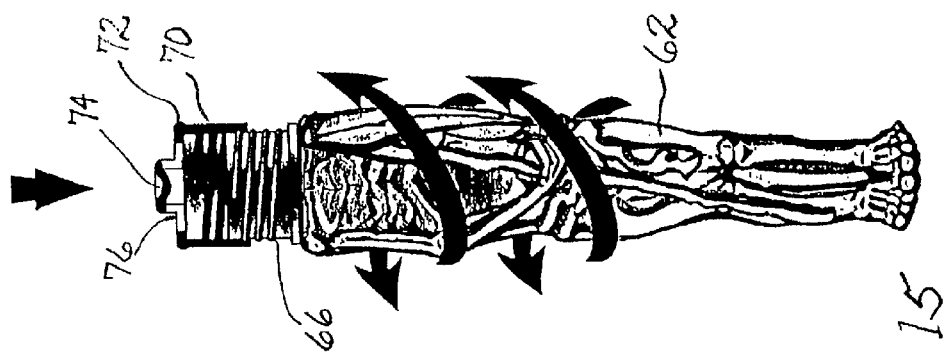

A reservoir cap 70 is provided for closing the open end 64 of the reservoir 62. The cap 70 has a main body that threadedly engages the threads 66 on the upper neck portion of the reservoir 62. The arrows in FIG. 15 illustrate the relative downward and twisting movement of the cap 70 as it is being secured onto the reservoir 62 over the open end 64 of the reservoir 62. FIG. 16 is an elevational view of the reservoir 62 with the cap 70 secured thereon in its fully engaged position. The cap 70 has a projection or lip 72 projecting radially outwardly from the top of the main body. It also has a generally cylindrical protuberance projecting axially upwardly from a center portion of the top of the main body. The protuberance is coaxial with the main body of the cap 72 and the threaded neck of the reservoir 62. The protuberance includes an upper break-away portion 74. The break-away portion 74 is attached to the main body of the cap 70 by a web 76.

Figure 19:
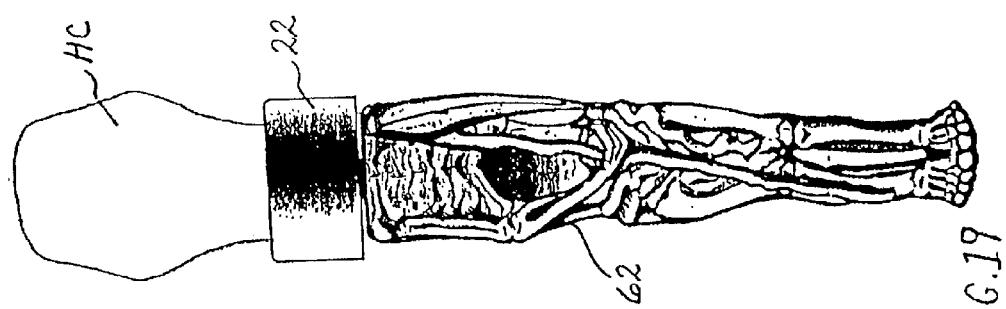
Figure 18:
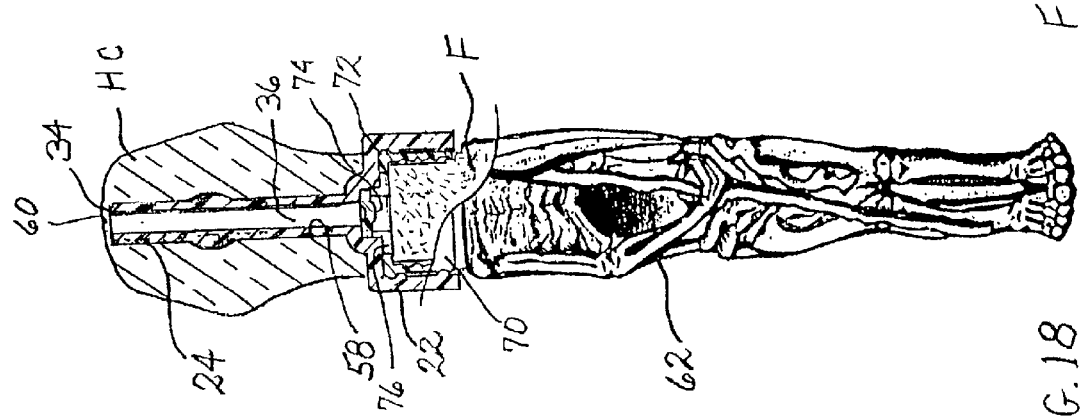
Figure 17:
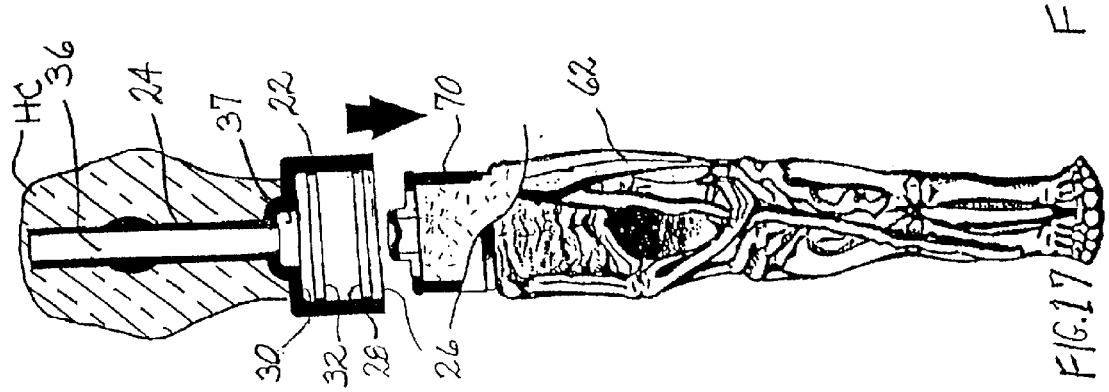

FIGS. 17–20 illustrate the method of the invention following the anchoring of the holder 22, 24 into the body of candy HC and the filling and closing of the reservoir 62. The holder 22, 24/candy HC is moved toward the filled and closed reservoir 62, as illustrated in FIG. 17. The arrow in FIG. 17 illustrates the downward movement of the holder/candy assembly relative to the reservoir 62. The cup-shaped portion 22 of the holder 22, 24 is snapped onto the reservoir cap 70. The lip 72 on the cap 70 is snapped past the ridges 28, 30 on the inner surface of the cup-shaped portion 22. FIG. 18 illustrates the reservoir 62 after the holder 22, 24 has been snapped down all the way into its fully engaged position on the cap 70. The protuberance on the cap 70 extends into the inner recess 37 in the cup-shaped portion of the holder 22, 24 so that the break-away portion 74 blocks the bottom of the passageway in the tubular portion 24. The blocking of the passageway 36 helps prevent unwanted movement of the fluid F into the passageway 36 prior to consumption of the candy product. The lip 72 of the cap 70 is received between the upper inner surface 30 and the second ridge 32 of the cup-shaped portion 22. This relative positioning releasably maintains the holder 22, 24 in its fully engaged position. FIG. 19 is like FIG. 18 except that all of the parts are shown in elevation.

Figure 20:
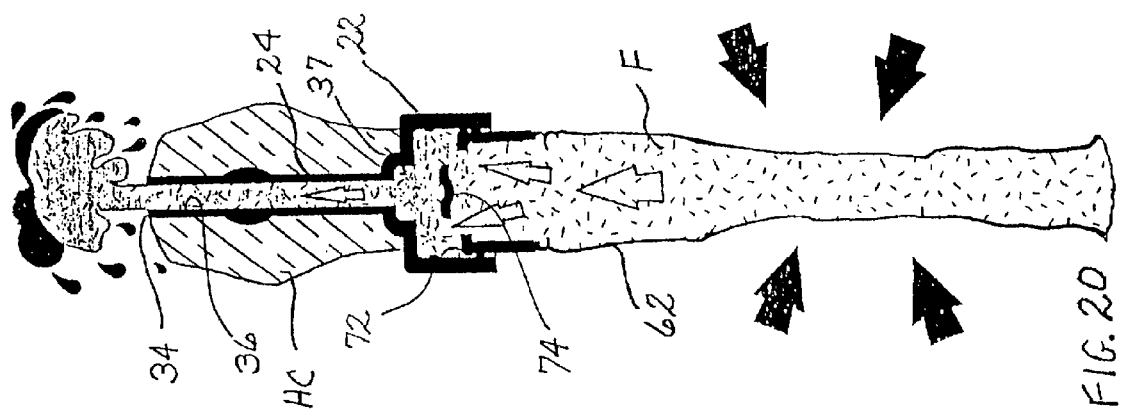
FIG. 20 is a sectional view illustrating the use of the candy product shown being manufactured in FIGS. 7–19.

When the holder 22, 24 is snapped onto the cap 70, it engages the cap 70 in a manner that permits a subsequent consumer to pull up on the holder 22, 24 without removing the holder 22, 24 from the cap 70. The consumer exerts an upward force on the holder 22, 24 relative to the reservoir 62. The positive upward pulling force moves the lip 72 downwardly past the second ridge 32. The holder 22, 24 moves upwardly relative to the cap 70 until the lip 72 engages the first ridge 28. Further downward movement of the reservoir 62 and its cap 70 relative to the holder 22, 24 is inhibited by engagement of the lip 72 with the first ridge 28, as illustrated in FIG. 20. When the consumer senses the engagement of the lip 72 and ridge 28, the consumer discontinues the relative upward movement of the holder 22, 24.

As can be seen in FIG. 20, the protuberance on the cap 70 has moved downwardly out of the upper recess 37 in the holder 22, 24. Since the thin layer 60 of candy on the candy body HC closes the end of the passageway 36 at the outer end 34 of the tubular portion 24 of the holder, the relative downward movement of the reservoir 62 creates a suction force on the top of the cap 70 that tends to detach the break-away portion 74 from the main body of the cap 70 to open fluid communication between the reservoir 62 and the passageway 36. The connection between the break-away portion 74 and the main body of the cap 70 is sufficiently frangible to cause the break-away portion 74 to detach from the main body when the holder 22, 24 is moved upwardly relative to the cap 70. However, the consumer may squeeze the reservoir 62 to assist the suction force in detaching the break-away portion 74 from the main body of the cap 70. FIG. 20 shows the break-away portion 74 fully detached and separated from the main body of the cap 70.

After the holder 22, 24 has been pulled up and the break-away portion 74 has been detached, the candy product is ready for consumption. The hard candy body HC is consumed in the well-known manner of consuming a lollipop. Preferably, as the consumer begins to eat the product, the consumer gives a few quick licks to the top of the candy body HC to dissolve away the thin layer 60 and open up the top of the passageway 36. Once the passageway 36 has been opened, the consumer may combine the candy HC and the fluid F from the reservoir 62 when desired and in what quantity desired simply by squeezing the reservoir 62 to force the fluid F upwardly and out through the top of the tubular portion 24 of the holder 22, 24, as illustrated in FIG. 20.

Figure 21:
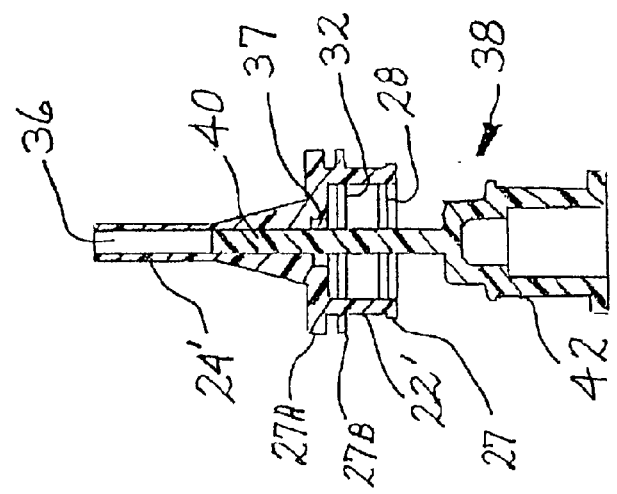
FIG. 21 is like FIG. 7 except that it shows a modified form of the holder which is currently the most preferred embodiment of the holder.

FIGS. 21–23 show modifications of the parts shown in FIGS. 7–20. The candy product with the modifications shown in FIGS. 21–23 is currently the most preferred embodiment of the candy product. Referring to FIG. 21, the preferred modified form of the holder 22', 24' has a cup-shaped portion 22' and a tubular portion 24'. Like the holder 22, 24 shown in FIG. 7, the modified holder 22', 24' has ridges 28, 32 on the inner cylindrical surface of the cup-shaped portion 22'. The cup-shaped portion 22' also has a substantially cylindrical upper recess 37. A passageway 36 extends through the cup-shaped portion 22' and the tubular portion 24'. The modifications to the holder configuration are in the outer configuration of the holder 22', 24'. The tubular portion 24' has an upper cylindrical half and a lower flared half which tapers down to an increased diameter at the interface between the tubular portion 24' and the cup-shaped portion 22'. The holder 22, 24 shown in FIG. 7 lacks this flaring of the lower part and has a rounded upper bead 25 that is absent in the modified holder 22', 24'. The cup-shaped portion 22' of the modified holder has a lower rim 27 with a slightly increased diameter. It also has two upper annular flanges 27A, 27B. These additional features of the cup-shaped portion 22' assist in the removal of the pin 38 from the holder 22', 24' and also assist in the handling of the candy product by the consumer. As can be seen in FIG. 21, in the manufacture of the most preferred embodiment, the holder 22', 24' accommodates the same pin 38 as does the holder 22, 24 shown in FIG. 7.

FIGS. 22 and 23 illustrate a modified form of the reservoir 62' that is currently the most preferred embodiment of the reservoir. The reservoir 62' has an elongated spiral configuration that forms finger grips 68 that assist the consumer in handling the reservoir 62' and also increase its aesthetic appeal. The reservoir 62' receives a reservoir cap 70 as described above in connection with the skeleton design reservoir 62. FIG. 22 also illustrates a difference in the shape of the candy body HC'. The outer surface of the body HC' has a simpler substantially oval configuration. Because of the different shape of the tubular portion 24' of the holder, the inner surface of the body of hard candy HC' also has a different configuration. The body HC' has an upper thin layer 60 as discussed above in connection with the body of candy HC shown in FIG. 19. The outer shape of the candy body HC could also have a wide variety of other configurations.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A candy product comprising:
   a solid body of candy having a passage extending at least substantially therethrough;
   a holder including a cup-shaped portion having an open end, and a tubular portion projecting from said cup-shaped portion opposite said open end; said tubular portion extending from said cup-shaped portion into said passage and being anchored in said passage, and said holder having a passageway extending through said cup-shaped portion and said tubular portion;
   a reservoir sized and shaped to be gripped by a consumer's hand and having an open end;
   an edible fluid at least substantially filling said reservoir; and
   a reservoir cap secured to said reservoir and closing said open end of said reservoir;
   said cup-shaped portion of said holder being snap fit onto said cap; said cup-shaped portion and said cap having interengaging portions that allow a consumer exerting a pulling force on said holder to move said holder upwardly relative to said cap without removing said holder from said cap; and said cap having a break-away portion that is sufficiently frangible to break away when said holder is moved upwardly relative to said cap, to open fluid communication between said reservoir and said passageway.

2. The candy product of claim 1, wherein said reservoir is compressible to allow a consumer to squeeze said edible fluid into said passageway.

3. The candy product of claim 2, wherein an end of said passage is closely proximate to, but spaced from, an outer surface of said body of candy, leaving a thin layer of candy blocking an end of said passageway adjacent to said end of said passage.

4. The candy product of claim 1, wherein said reservoir is made at least partially from a flexible material to allow a consumer to squeeze said edible fluid into said passageway.

5. The candy product of claim 4, wherein an end of said passage is closely proximate to, but spaced from, an outer surface of said body of candy, leaving a thin layer of candy blocking an end of said passageway adjacent to said end of said passage.

6. The candy product of claim 1, wherein an end of said passage is closely proximate to, but spaced from, an outer surface of said body of candy, leaving a thin layer of candy blocking an end of said passageway adjacent to said end of said passage.

7. The candy product of claim 6, wherein said tubular portion extends into said passage to said end of said passage.

8. The candy product of claim 1, wherein said holder is integrally formed.

9. The candy product of claim 1, wherein said tubular portion extends into said passage to an end of said passage.

10. The candy product of claim 1, wherein said interengaging portions include a ridge on a side inner surface of said cup-shaped portion spaced longitudinally below an upper inner surface of said cup-shaped portion, and a projection on a top portion of said cap positioned to engage said ridge when said holder is moved upwardly relative to said cap.

11. The candy product of claim 10, wherein said holder is integrally formed.

* * * * *